United States Patent Office 3,169,867
Patented Feb. 16, 1965

3,169,867
MANUFACTURE OF PHOTO-SENSITIVE FILMS
Wilhelm Brandt, Wiesbaden-Biebrich, Germany, assignor to Kalle Aktiengesellschaft, Wiesbaden-Biebrich, Germany
No Drawing. Filed July 5, 1963, Ser. No. 293,191
Claims priority, application Germany, July 7, 1962,
K 47,180
10 Claims. (Cl. 96—87)

This invention relates to improvements in the manufacture of photo-sensitive films.

As is known, photographic gelatin-silver halide layers adhere firmly to films or coatings of nitrocellulose. Therefore, interlayers of nitrocellulose have been used as adhesion promoters for gelatin-silver halide layers and have been applied to film bases to which gelatin-silver halide layers do not adhere directly. Between such a nitrocellulose layer and the film base itself, an intimate bond develops when there is used for this coating operation a nitrocellulose dissolved in a solvent which causes a certain degree of swelling of the film base.

Photographic gelatin layers do not adhere directly to polyethylene terephthalate films. The application of nitrocellulose as an intermediate layer on a polyethylene terepthalate base has not been effected because no solvent is known which is suitable for the manufacture of nitrocellulose lacquers and also swells polyethylene terephthalate films sufficiently to form a firm bond with the applied layer of nitrocellulose. It has been proposed to use substances other than nitrocellulose for the preparation of an interlayer for such photographic materials, for example vinylidene chloride copolymers. However, such interlayers have, among others, the disadvantage that in their use the "know-how" that has accumulated in connection with the use of nitrocellulose solutions for the same purpose cannot be applied.

The present invention provides a process wherein a film of polyethylene terephthalate is treated with a swelling agent, the pre-treated film is coated with a nitrocellulose solution containing a dissolved sulfonic acid salt of an esterified succinic acid (sulfosuccinic acid) which is partially or completely esterified at the carboxyl groups with alkyl radicals containing 3 to 18 carbon atoms, and the layer thus produced is dried and coated with a photographic gelatin-silver halide layer. Excellent photographic films are thereby obtained.

The succinic acid ester sulfonate salts, at least one of which is present in the nitrocellulose solution used, must be soluble in the nitrocellulose solution and compatible therewith; the salts may be metal salts. Very good results have been obtained, for example with salts of the general formula

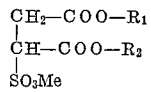

in which $R_1$ nd $R_2$ are alkyl radicals with 3 to 18 carbon atoms each and Me is an alkali metal, for example sodium or potassium. The alkyl radicals $R_1$ and $R_2$ may be, for example: propyl, butyl, amyl, isoamyl, hexyl, octyl, isooctyl, dodecyl, hexadecyl or octadecyl. The amount of the succinic acid alkyl ester sulfonate salt to be used may vary within wide limits, 0.2 part by weight or less per 100 parts by weight of nitrocellulose producing a definite effect. Good results have been obtained with 3 to 20 parts by weight of salt per 100 parts by weight of nitrocellulose. In general, best results are achieved when the amount of salt present in the nitrocellulose solution is decreased with higher drying temperatures of the nitrocellulose layer.

The films are advantageously dried at elevated temperatures. The permissible maximum temperature depends in the case of stretched films, among other things, on the temperature at which the films have been set and which to exceed makes the films shrink. These temperatures may range, for example, up to 180° C. and higher. While the film is being dried it should not reach the setting temperature, and in general the drying temperature should not be raised above 150° C. in view of the temperature sensitivity of nitrocellulose.

As a swelling agent for the polyethylene terephthalate film for use in the treatment thereof before depositing the nitrocellulose layer containing the succinic acid alkyl ester sulfonate thereon, there may be used, for example, trichloroacetic acid, chloral hydrate, resorcinol or trichlorophenol. The pre-treatment is advantageously performed using the agent in solution. As a solvent there should be used, if possible, water or a solvent mixture consisting of one or more organic solvents or a mixture thereof with water. When an aqueous solution is used, it is of advantage to add a small amount, for example 0.1 to 1 percent by weight, of a wetting agent, such as an alkali metal alkyl sulfonate, to the solution of the agent. For the treatment of the film with the agent, it has proved very simple and successful to immerse the film in the solution of the agent and then dry it. It suffices to immerse the film for a few seconds only. Alternatively, equally good results are obtained when the solution of the agent is sprayed or brushed on to the film in the form of a thin coating. A suitable range of drying temperatures is the same as mentioned above in connection with the drying of the film after coating it with nitrocellulose.

The present process can be applied with success to unstretched polyethylene terephthalate films or to films that have been stretched in one or both directions.

The following example further illustrates the invention.

*Example*

A biaxially stretched polyethylene terephthalate film, stabilized at 200° C., was immersed for 10 seconds at room temperature in a solution of 10 parts by weight of trichloracetic acid, 90 parts by volume of water and 0.3 part by weight of a wetting agent (sodium alkyl sulfonate) and then dried for 7 seconds in a current of air heated to 120° C. The dried film was brushed with a solution of 5 parts by weight of nitrocellulose, 80 parts by volume of dichlorethylene, 20 parts by volume of ethyl acetate and 0.5 part by weight of sodium dioctylsuccinic acid ester sulfonate. The thickness of the layer was adjusted so that, after the solvent had evaporated, a nitrocellulose layer of a thickness of 1 to 3μ remained. The coated film was dried for 30 seconds in a current of air heated to 120° C. The film coated in this manner was then coated with a photographic gelatin-silver halide emulsion in the conventional way.

The emulsion layer adhered firmly to the polyethylene terephthalate film. Even after the coated film had been treated in a conventional developer solution, then in a fixing bath and finally washed for a substantial time, the bond between the film base and the gelatin layer proved to be completely satisfactory.

It will be obvious to those skilled in the art that many modifications may be made within the scope of the present invention without departing from the spirit thereof, and the invention includes all such modifications.

What is claimed is:

1. A process for the production of a photosensitive film which comprises pretreating a polyethylene terephthalate film with a swelling agent, coating the film with a solution of nitrocellulose containing a salt of a sulfosuccinic acid which is at least partially esterified with alkyl groups of 3 to 18 carbon atoms, drying the coating, and applying a photographic gelatin-silver halide layer.

2. A process according to claim 1 in which the acid is completely esterified.

3. A process according to claim 1 in which the swelling agent is trichloracetic acid.

4. A process according to claim 1 in which the salt is sodium dioctylsuccinic acid ester sulfonate.

5. A process according to claim 1 in which the film is stretched.

6. A photosensitive film comprising a polyethylene terephthalate base, a first layer comprising nitrocellulose and a salt of a sulfosuccinic acid which is at least partially esterified with alkyl groups of 3 to 18 carbon atoms, and a second photographic gelatin-silver halide layer.

7. A film according to claim 6 in which the acid is completely esterified.

8. A film according to claim 6 in which the swelling agent is trichloracetic acid.

9. A film according to claim 6 in which the salt is sodium dioctylsuccinic acid ester sulfonate.

10. A film according to claim 6 in which the film is stretched.

No references cited.